Figure 1:
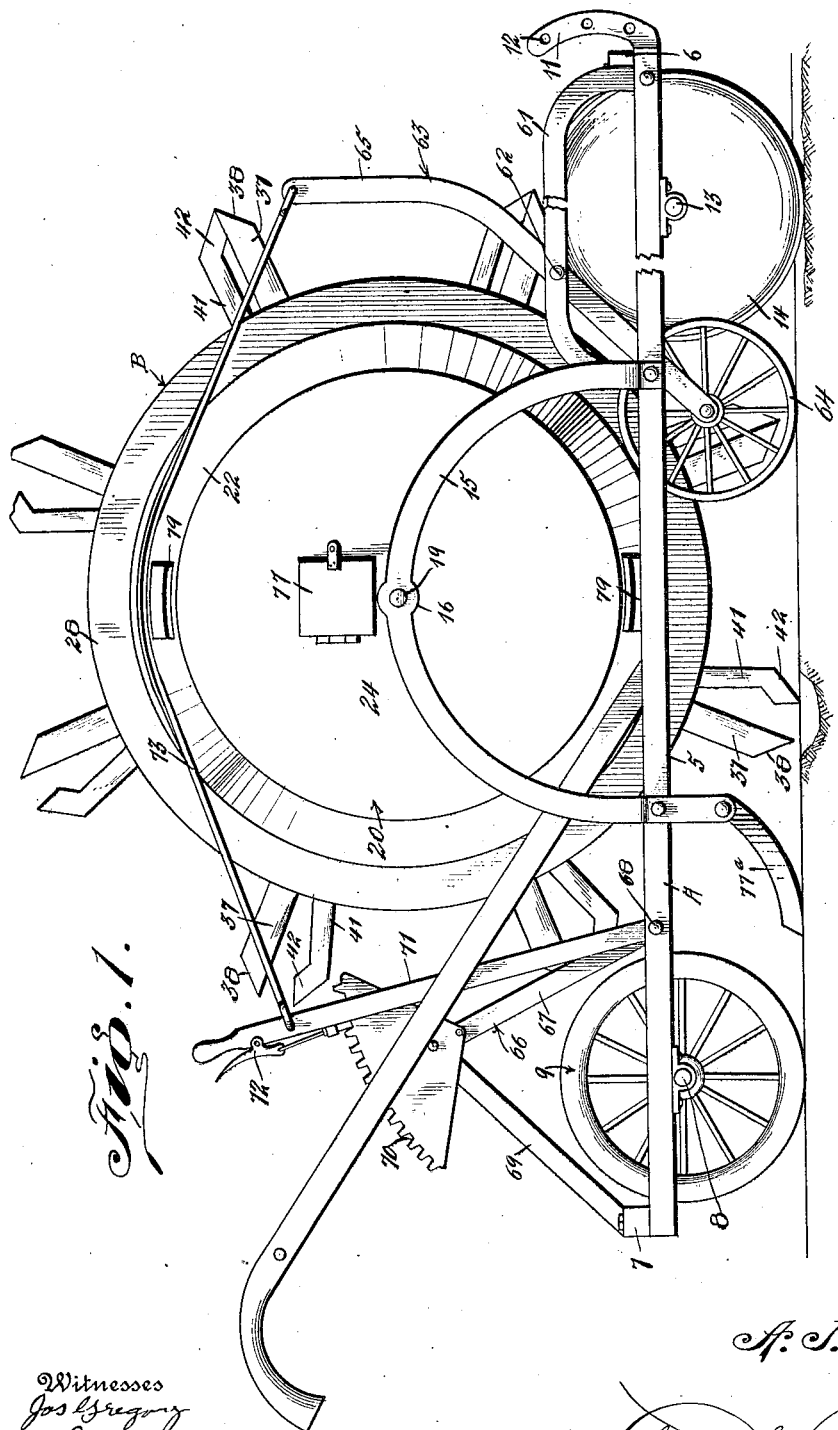

A. J. BURKETT.
COMBINED SEED PLANTER AND FERTILIZER DISTRIBUTER.
APPLICATION FILED MAR. 17, 1913.

1,087,211. Patented Feb. 17, 1914.
5 SHEETS—SHEET 1.

Witnesses
Jos Gregory
George Yates

Inventor
A. J. Burkett
By Chandler & Chandler
Attorneys

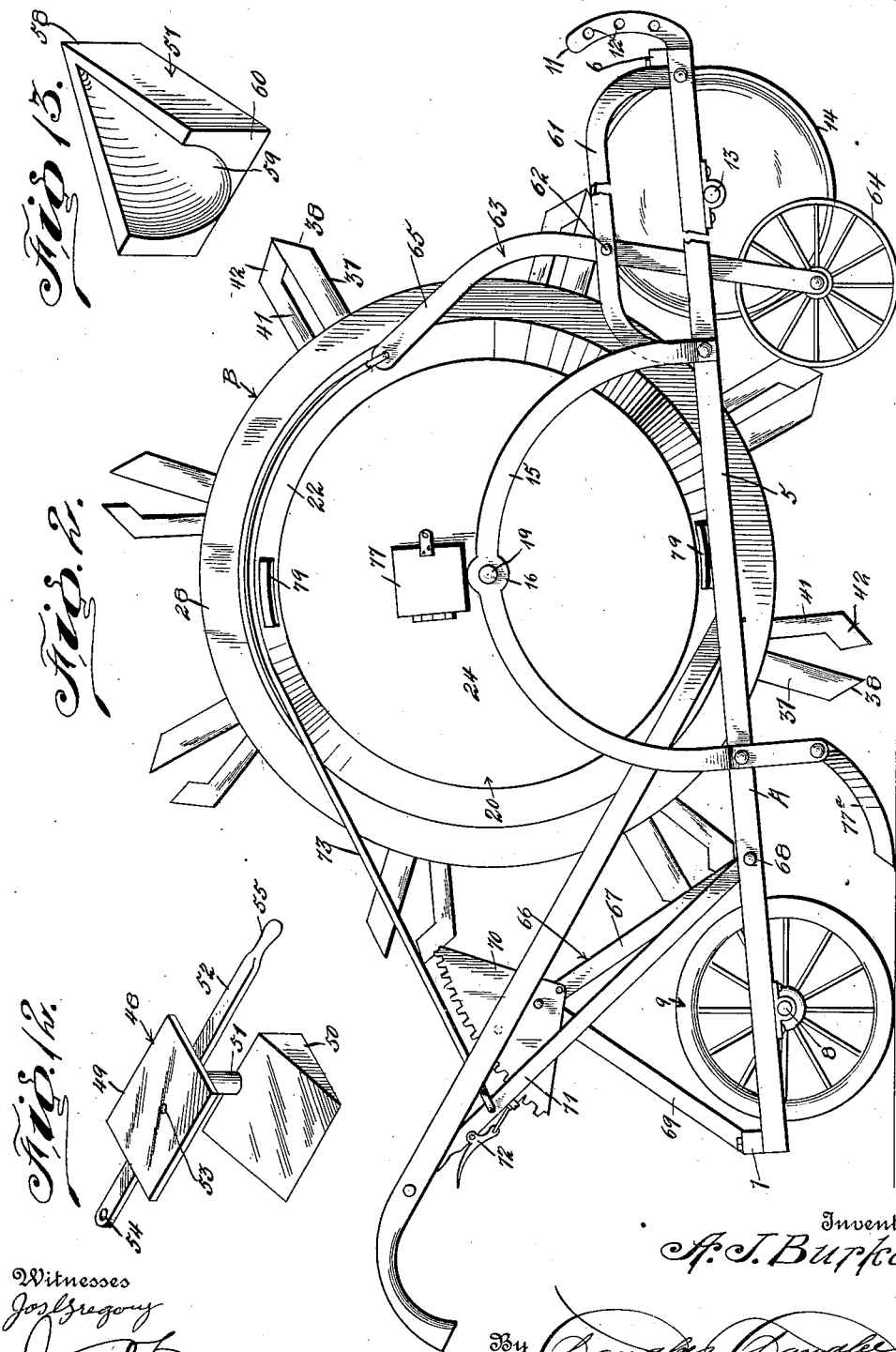

A. J. BURKETT.
COMBINED SEED PLANTER AND FERTILIZER DISTRIBUTER.
APPLICATION FILED MAR. 17, 1913.
1,087,211.
Patented Feb. 17, 1914.
5 SHEETS—SHEET 3.
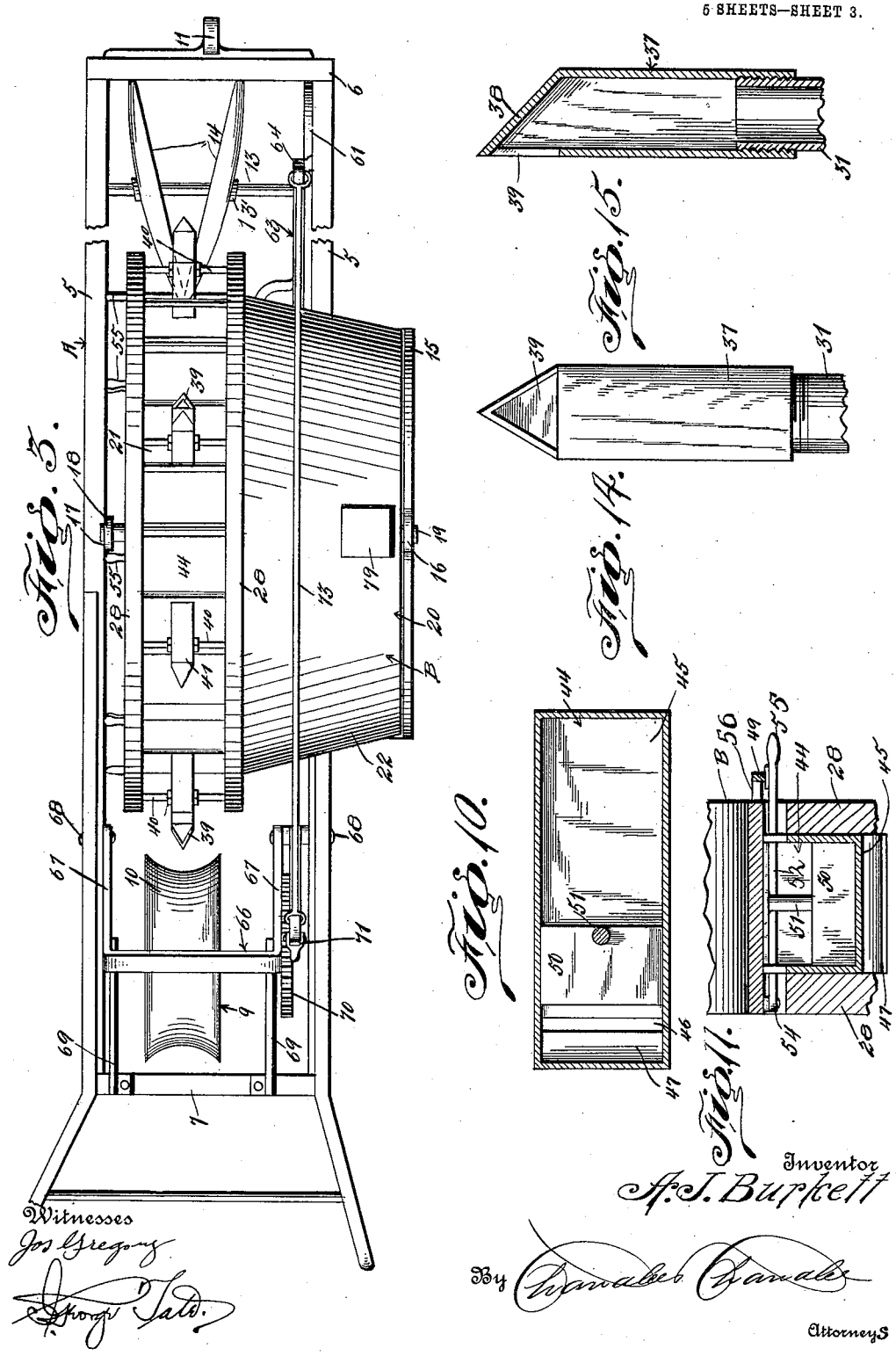

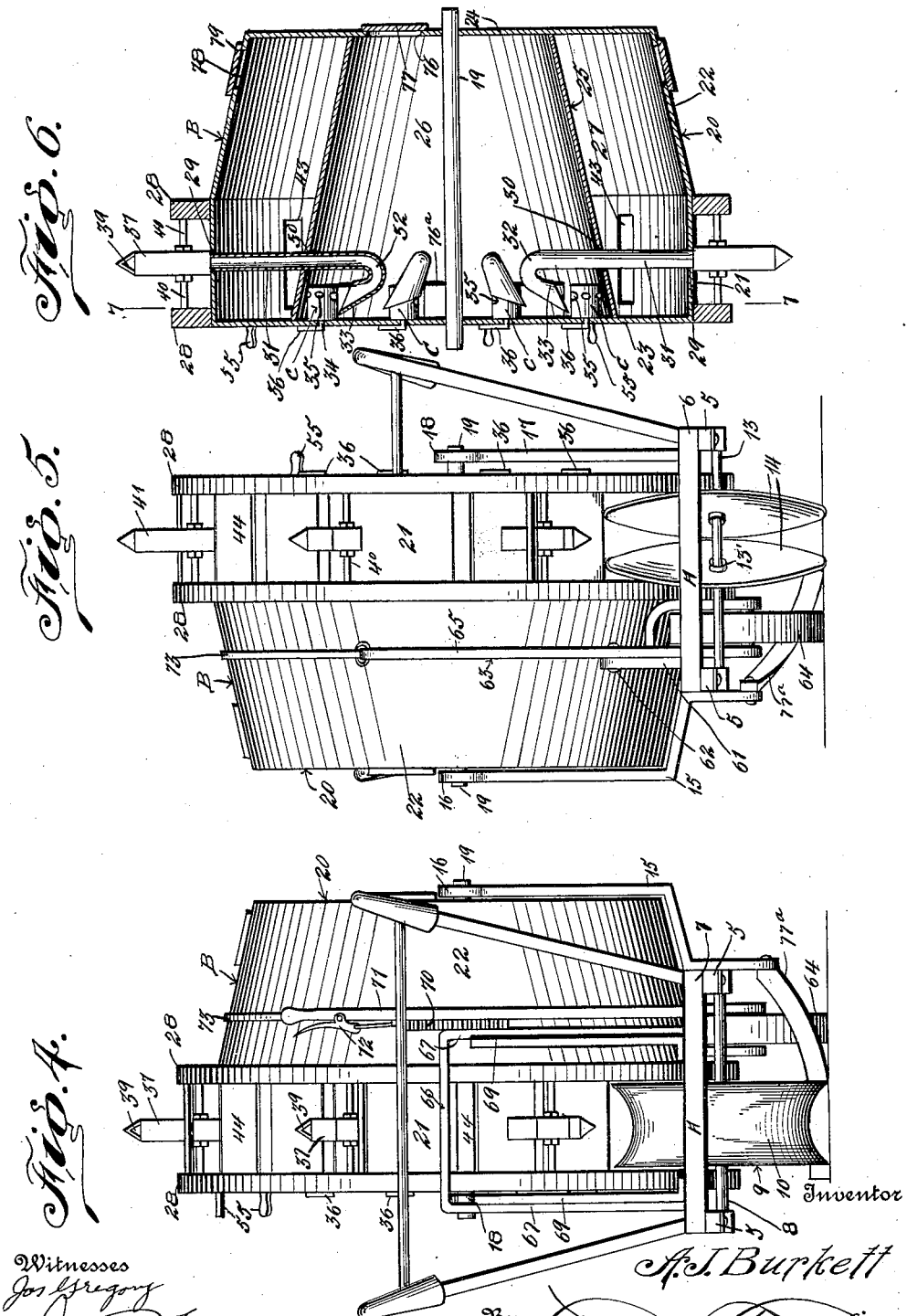

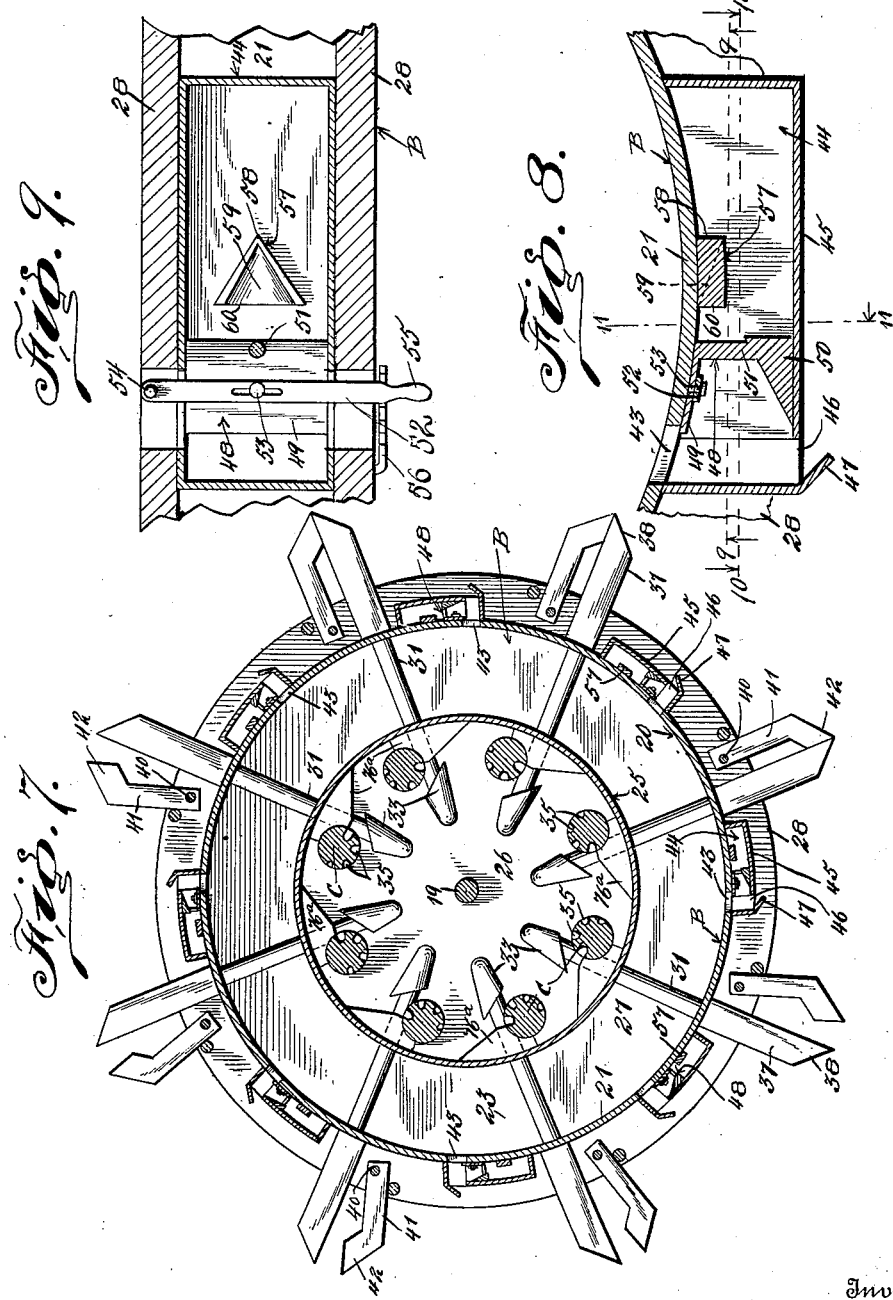

UNITED STATES PATENT OFFICE.

ABRAM J. BURKETT, OF WAVERLY, VIRGINIA.

COMBINED SEED-PLANTER AND FERTILIZER-DISTRIBUTER.

1,087,211. Specification of Letters Patent. Patented Feb. 17, 1914.

Application filed March 17, 1913. Serial No. 754,868.

*To all whom it may concern:*

Be it known that I, ABRAM J. BURKETT, a citizen of the United States, residing at Waverly, in the county of Sussex, State of Virginia, have invented certain new and useful Improvements in Combined Seed-Planters and Fertilizer-Distributers; and I do hereby declare the following to be a full, clear, and exact description of the invention, such as will enable others skilled in the art to which it appertains to make and use the same.

This invention relates to new and useful improvements in a combined seed planter and fertilizer distributer.

The principal object of the invention is to provide an agricultural implement of the character described in which means are provided for distributing predetermined quantities of seeds in rows and at uniform distances apart.

Another object of the invention is to provide an agricultural implement of the character described in which means are provided for discharging the seed into recesses formed by dibbles immediately after the dibbles have left their respective recesses.

Another object of the invention is to provide an implement of the character described in which quantities of fertilizer are discharged upon the ground previous to the dropping of the seed.

A further object of the invention is to provide an agricultural implement for the purpose set forth which includes a rotary seed and fertilizer hopper which is arranged for rotation by contact with the ground and which is adapted to be elevated and retained in said elevated position when it is desired to transport the implement.

A still further object of the invention is to provide an implement of the character described which is composed of a minimum number of parts, is therefore simple in construction and cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a side elevation of an implement constructed in accordance with my invention the view showing the parts in position ready for operation, Fig. 2 is a similar view but showing the parts in their inoperative position, Fig. 3 is a top plan view, Fig. 4 is a rear end elevation, Fig. 5 is a front elevation, Fig. 6 is a detail vertical sectional view through the combined seed and fertilizer hopper, Fig. 7 is a longitudinal sectional view taken on the line 7—7 of Fig. 6, Fig. 8 is an enlarged vertical sectional view through one of the fertilizer discharge pockets, Fig. 9 is a horizontal sectional view taken on the line 9—9 of Fig. 8, Fig. 10 is a horizontal sectional view taken on the line 10—10 of Fig. 8, Fig. 11 is a transverse sectional view taken on the line 11—11 of Fig. 8, Fig. 12 is a perspective view of a double acting valve, Fig. 13 is a perspective view of the spreading block, Fig. 14 is an enlarged front elevation of one of the dibbles, and Fig. 15 is a vertical sectional view therethrough.

Like reference numerals designate corresponding parts in all the figures of the drawings.

Referring to the drawings, the invention comprises a main frame A which includes side sills 5—5, a front end sill 6 and a rear end sill 7. A transverse axle 8 is suitably supported below the side sills 5, at the rear end of the frame, and on this axle is loosely mounted a ground wheel 9, having a concaved periphery 10, for pressing the earth upon the seed, as will hereinafter be more fully explained. Centrally extending upwardly from the front end sill 6 is a draft arm 11 which is formed with a plurality of openings 12 for attachment with a clevis. A transverse axle 13 is fixedly supported below the sills 5 at the front end of the frame, and fixedly mounted on this axle is a pair of diagonally and peripherally grooved hubs 13′ carrying disks 14—14, which serve not only to support the front end of the frame, but also to cut a furrow or make a ridge in advance of the seed dropping mechanism. The grooves of the hubs 13′ have their respective disks 14 rotatably mounted therein, and by unclamping the ends of the shaft 13 and rotating it to 180 degrees, the disks are adjusted for bringing their rear or front edges into proximity, for forming a ridge or a furrow, as desired.

Secured to the right hand side sill 5 of the frame A is an offset U-shaped bracket 15, said bracket being disposed intermediate the axles 8 and 13 and having a bearing 16 centrally formed in the bight portion thereof. Extending upwardly from the other side sill 5 is a standard 17 having a bearing 18 formed at its upper end and arranged in alinement with the bearing 16 above mentioned. Rotatably mounted in the bearings 16 and 18 is a transverse axle 19, and fixed on this axle is a rotary hopper which is designated as a whole by the reference letter B. This hopper consists of an outer drum 20, and this drum includes an inner portion 21 which is arranged concentric with the axle 19 and an outer portion 22 which tapers from the inner portion toward said axle. This drum is closed by inner and outer heads 23 and 24 respectively. Disposed within the outer drum 20 and arranged concentric to the axle 19 is an inner drum 25. This inner drum is of frusto-conical formation and has its larger end secured to the inner head 23 and its smaller end secured to the outer head 24. As a result, the inner drum 25 forms a seed compartment 26, and the space between the inner and outer drums 20 and 25 form a fertilizer compartment 27. It will thus be observed that the seed within the compartment 26 will by gravity always work toward the inner head 23, and the fertilizer within the compartment 27 will always work toward the inner head 23, this being due to the inclinations of the inner drum 25 and the outer portions 22 of the outer drum 20.

Extending from the outer face of the inner portion 21 of the outer drum 20 is a pair of spaced peripheral flanges 28—28. Formed in the inner portion 21 of the outer drum 20 and centrally disposed between the flanges 28 is a series of uniformly spaced openings 29, and formed in the inner drum 25 and arranged in radial alinement with the openings 29 is a series of uniformly spaced openings 30. Disposed within each pair of alined openings 29 and 30 is a seed discharge pipe 31, the inner end thereof being formed with a goose neck 32 which terminates in an outwardly directed flared inlet end 33, said end being disposed between the pipe 31 and the inner head 23 of the hopper B. These inlet ends 33 are disposed in spaced relation to the inner drum 25, and journaled in suitable openings formed in the inner head 23 and respectively arranged directly between the inlet ends 33 and the inner drum 25 are cranks 34. Fixed on the inner ends of the cranks are seed carriers C, each carrier consisting of a solid cylinder having a spaced series of graduated pockets 35 formed in its periphery and arranged in alinement with the inlet end 33 of a respective seed discharge pipe 31. Each crank 34 includes a hand lever 36 which extends exteriorly of the inner head 23 and has frictional engagement with said head to lock the carrier C in any adjusted position whereby any particular pocket 35 may be retained in operative relation to the inner end 33 of the respective discharge pipe 31. Fixed on the outer end of each discharge pipe 31 is a dibble 37, the outer end thereof being disposed beyond the flanges 28 and having, when the dibble is disposed directly below the axle 19, a forwardly inclined bevel 38. This dibble is formed at the outer end of the front side with a discharge opening 39. A transverse pivot bolt 40 is disposed in advance of each dibble 37 and is connected at its ends to the flanges 28. Pivotally mounted upon this bolt is a gravity valve 41 which is formed at its outer end with a rearwardly inclined portion 42 adapted to close the discharge opening 39 in certain positions of the dibble.

Formed in the inner portion 21 of the outer drum 20 is a series of uniformly spaced openings 43. Each opening registers with one end of a rectangular casing 44 which is secured to the outer face of the inner portion 21 between the flanges 28. This casing includes a bottom 45 having an opening 46 formed therein and arranged in register with the opening 43. This opening is formed by striking up the bottom to form a resultant transverse guide lip 47. In order to regulate the discharge of fertilizer from the compartment 27 through the openings 43 and 46, there is provided a double valve which is designated as a whole by the reference numeral 48. This double valve consists of inner and outer valves 49 and 50 which are centrally connected by a standard 51. The valve 49 is adapted to regulate the discharge opening 43, and the valve 50 is adapted to regulate the opening 46. In order to actuate this valve a transverse lever 52 is centrally fulcrumed, as at 53, to the valve 49. One end of this lever is pivoted, as at 54, to the inner portion 21 of the outer drum 20, and the other end of this lever terminates in a handle 55 which extends beyond the inner head 23 of the hopper B. Rack bars 56 are carried by the hopper B for respective engagement with the levers 52 for locking the latter in any adjusted position and thereby regulating the openings 43 and 46 as may be desired. Disposed within each casing 44 and secured to the outer face of the inner portion 21 of the outer drum 20 is a spreader block 57. This block is of V-shaped construction and has its apex 58 disposed in a direction opposite the double valve 48. The outer face of this block is formed with an inclined V-shaped groove 59 which extends from the base 60 toward the apex 58.

In order to support the forward end of the main frame A, the sill 5 adjacent the inner head 24 of the hopper B supports a bracket 61, and centrally fulcrumed upon this bracket, as at 62, is a lever 63, the lower end thereof extending below the main frame A and having a ground wheel 64 suitably journaled thereon. The upper end 65 of the lever 63 extends rearwardly and is adapted in one position of the lever to bear against the outer portion 22 of the hopper B, and thereby prevent the ground wheel 64 from further forward movement. Extending upwardly from the side sills 5 of the main frame A in rear of the hopper B is an inverted U-shaped bracket 66, the legs 67—67 thereof being disposed within the sills 5 and connected thereto by means of bolts 68—68.

In order to retain the bracket against movement inclined braces 69—69 are each connected to the rear end sills 7 of the main frame A and to the connecting portion of the bracket 66. Fixed to the legs 67 of the bracket 66 and arranged in register with the outer portion 22 of the outer drum 20 is a quadrant 70, and pivotally mounted on the adjacent bolt 68 is a hand lever 71 which carries at its upper end the usual pawls 72 for engagement with the quadrant. A flexible brake strap 73 is connected at one end to the upper end 65 of the lever 63, and at its other end to the upper end of the hand lever 71. This brake strap operates on the outer portion of the hopper B.

In order to insert seed into the compartment 26 the outer head 24 is formed with an opening 76, and this opening is closed by a closure 77 of any suitable construction.

In order to insert fertilizer into the compartment 27, the outer portion 22 of the outer drum 20 is formed with an opening 78, and this opening is closed by any suitable closure 79.

In practice when it is desired to plant seed and drop fertilizer, the hand lever 71 is released so as to position the ground wheel 64 and main frame A as shown in Fig. 1 of the drawings. As the machine is thus moved over the ground, the disks 14 cut a furrow in advance of the dibbles 37. The dibbles 37 together with the gravity valves 41 conjointly engage the ground in succession and thereby form pockets for receiving the seed. The engagement of the dibbles with the ground causes the hopper B to rotate and as a result the seed carriers C are caused to be moved down into the seed. These carriers thus pick up seed within the pocket 35 which registers with the inlet end 33 of the discharge pipe 31. Upon continued rotation of the hopper B these carriers are elevated until they pass above the axle 19. At this point the carriers drop the seed into the inlet end 33 of the discharge pipe 31, and this seed then travels downwardly to the goose-neck 32 of said pipe and upon further rotation of the hopper this seed will fall by gravity downwardly through the pipe 31. This seed, however, will be prevented from passing out of the dibble 37 by reason of the gravity valves 41, until said dibble and valve have passed below the axle 19. As the hopper B rotates the fertilizer within the compartment 37 will pass downwardly through the opening 43 and into the casing 44, the amount of the fertilizer discharged being regulated by the double acting valve 48. The fertilizer passing through the opening 43 will be carried around the hopper B and will be discharged by gravity through the opening 46 and over the lip 47, said fertilizer being caused to be spread by means of the block 57. It will thus be observed that quantities of seed and fertilizer are alternately dropped in succession and in uniform distances apart.

In order to assist the seed entering the respective pockets 35 of the carriers C, the inner drum 25 is provided in advance of each carrier with an inclined block $76^a$.

In order to cover the seed and fertilizer which has been dropped within the furrow the main frame A supports a covering element $77^a$. As the machine moves forward the covering element $77^a$ covers the seed and fertilizer with earth and the ground wheel 9 serves to press the earth upon said seed and fertilizer.

When it is desired to transport the machine, the hand lever 71 is swung rearwardly, thereby swinging the upper end 65 of the lever 63 rearwardly to engage the outer portion 22 of the outer drum 20. At the same time the ground wheel 64 is moved forwardly, and as a result, the forward end of the main frame is elevated a distance sufficient to project the dibbles 37 above the ground. Simultaneously with this movement the brake band 73 serves to frictionally engage the outer portion 22 of the outer drum 20, and as a result, the hopper B is locked against displacement and consequently seed and fertilizer is prevented from becoming discharged.

What is claimed is:

1. In an agricultural implement, a main frame, a hopper rotatably mounted thereon including inner and outer drums forming resultant seed and fertilizer compartments, and means communicating with said compartments for alternately discharging predetermined amounts of seed and fertilizer upon rotation of the hopper.

2. In an agricultural implement, a main frame, a hopper rotatably mounted thereon including inner and outer drums forming resultant seed and fertilizer compartments, means communicating with said compartments for discharging quantities of seed and fertilizer in succession upon rotation of said hopper, means for regulating the discharge of seed, and means for regulating the discharge of fertilizer.

3. In an agricultural implement, a main frame, a hopper rotatably mounted thereon including inner and outer drums forming resultant seed and fertilizer compartments, a plurality of uniformly spaced discharge pipes extending radially through the inner and outer drums of the hopper, the inner end of each pipe being formed with a gooseneck constituting an inlet for the seed, a dibble secured to the outer end of each pipe exterior of the outer drum and formed with an outlet opening, gravity valves swingingly mounted upon the hopper and adapted to close certain of the outlet openings of the dibbles during the rotation of said hopper, the outer drum being formed with a plurality of openings respectively disposed intermediate said discharge spout, and valves for respectively controlling the discharge of fertilizer through said opening.

4. In an agricultural implement, a main frame, a covering wheel journaled on and supporting the rear end of said frame, a hopper rotatably mounted on the frame in advance of the frame and including a seed compartment, dibbles extending from the periphery of the hopper for engagement with the ground, each dibble being formed with an outlet opening, means connected to each dibble and communicating with the seed compartment for discharging a predetermined amount of seed upon rotation of the hopper, and means for raising and lowering the front end of the frame.

5. In an agricultural implement, a main frame, a covering wheel journaled on and supporting the rear end of said frame, a seed hopper rotatably mounted on the frame in advance of the wheel, a lever fulcrumed on the frame in advance of the hopper, a ground wheel carried by the lower end of the lever, a hand lever fulcrumed on the frame in rear of the hopper, and a brake band connected at its ends to the upper end of the lever and to the hand lever for simultaneously raising the front end of the frame and locking the hopper against rotation upon movement of the hand lever in one direction.

In testimony whereof, I affix my signature, in presence of two witnesses.

ABRAM J. BURKETT.

Witnesses:
HOWELL J. BAILEY,
E. W. BRITTLE.

---

Copies of this patent may be obtained for five cents each, by addressing the "Commissioner of Patents, Washington, D. C."